United States Patent
Okuyama et al.

(10) Patent No.: US 11,685,445 B2
(45) Date of Patent: Jun. 27, 2023

(54) VEHICLE ROOF STRUCTURE

(71) Applicant: MAZDA MOTOR CORPORATION, Hiroshima (JP)

(72) Inventors: Tomohito Okuyama, Hiroshima (JP); Ryuji Nonaka, Hiroshima (JP); Junji Kishimoto, Hiroshima (JP); Toshimine Morino, Hiroshima (JP); Kazuhisa To, Hiroshima (JP); Chikara Tanaka, Hiroshima (JP); Shin Sasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 72 days.

(21) Appl. No.: 17/432,998

(22) PCT Filed: Feb. 7, 2020

(86) PCT No.: PCT/JP2020/004974
§ 371 (c)(1),
(2) Date: Aug. 23, 2021

(87) PCT Pub. No.: WO2020/179357
PCT Pub. Date: Sep. 10, 2020

(65) Prior Publication Data
US 2022/0169313 A1    Jun. 2, 2022

(30) Foreign Application Priority Data

Mar. 6, 2019   (JP) .................................. 2019-040582

(51) Int. Cl.
| | |
|---|---|
| *B62D 25/06* | (2006.01) |
| *B60J 7/043* | (2006.01) |
| *B62D 29/04* | (2006.01) |

(52) U.S. Cl.
CPC .............. *B62D 25/06* (2013.01); *B60J 7/043* (2013.01); *B62D 29/043* (2013.01)

(58) Field of Classification Search
CPC ... B60J 7/04; B60J 7/043; B60J 7/0435; B60J 7/05; B60J 7/053; B60J 7/11;
(Continued)

(56) References Cited

U.S. PATENT DOCUMENTS 8,827,588 B2 * 9/2014 Inaba .................... F16B 5/0657
411/523

FOREIGN PATENT DOCUMENTS

| DE | 10158742 B4 * | 3/2005 | ............. B60J 7/047 |
|---|---|---|---|
| DE | 10 2015 202 080 A1 | 8/2016 | |

(Continued)

OTHER PUBLICATIONS

International Search Report issued in PCT/JP2020/004974; dated Apr. 7, 2020.

*Primary Examiner* — Dennis H Redder
(74) *Attorney, Agent, or Firm* — Studebaker & Brackett PC (57) ABSTRACT

A vehicle roof structure is provided capable of maintaining side collision performance of a vehicle even without a roof reinforcing member. The vehicle roof structure includes an annular frame that is joined to a circumferential edge of a roof panel (which includes an outer panel and an inner panel), and supports the roof panel. The annular frame has a higher rigidity than the roof panel, is arranged in an opening of a roof, and is joined to a pair of roof side rails, a front header, and a rear header.

14 Claims, 4 Drawing Sheets

(58) Field of Classification Search
CPC ........ B60J 7/1628; B60J 7/1642; B60J 7/165;
B60J 7/1657; B62D 25/06; B62D 29/043;
B62D 29/04; B62D 27/065; B62D 27/023
USPC ................................ 296/216.06–9, 211, 215
See application file for complete search history.

(56) References Cited

FOREIGN PATENT DOCUMENTS

| | | | |
|---|---|---|---|
| DE | 10 2017 104 240 A1 | 9/2018 | |
| FR | 2882982 A1 * | 9/2006 | ............. B62D 25/06 |
| JP | 2008-068762 A | 3/2008 | |
| JP | 3194846 U | 12/2014 | |

* cited by examiner

VEHICLE ROOF STRUCTURE

TECHNICAL FIELD

The present disclosure relates to a vehicle roof structure.

BACKGROUND

Conventionally, a vehicle roof reinforcing member that extends between a pair of roof side rails is provided such that the roof bears a large load when another vehicle collides with a side portion of the vehicle (that is, a side collision).

Recently, due to various requests such as making a roof panel translucent and improving roof design by removing the roof reinforcing member, a roof structure that is reinforced by means other than a roof reinforcing member has been desired. A roof structure that does not have a roof reinforcing member is disclosed in Japanese Utility Model Registration No. 3,194,846 and the like.

Figure 5:
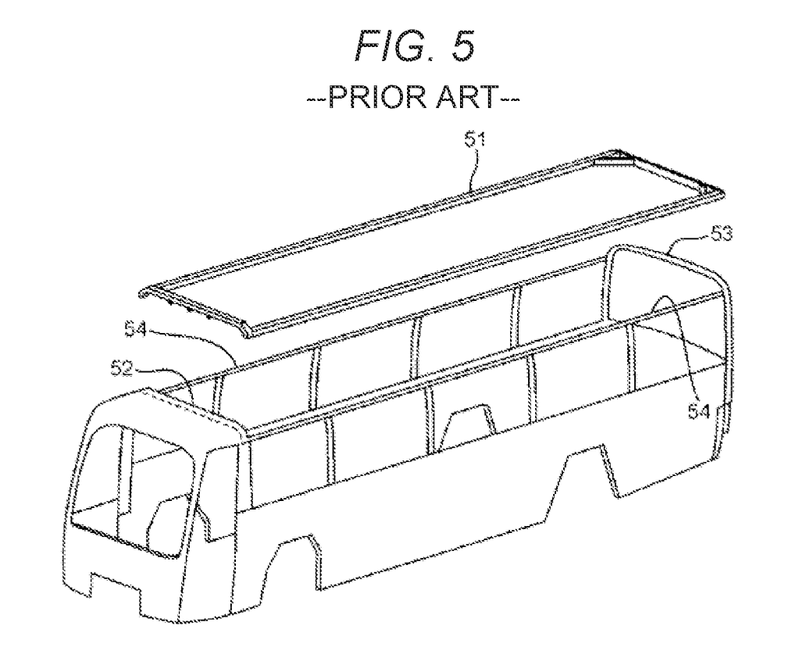
FIG. 5 is a perspective view illustrating a conventional vehicle roof structure.
Figure 6:
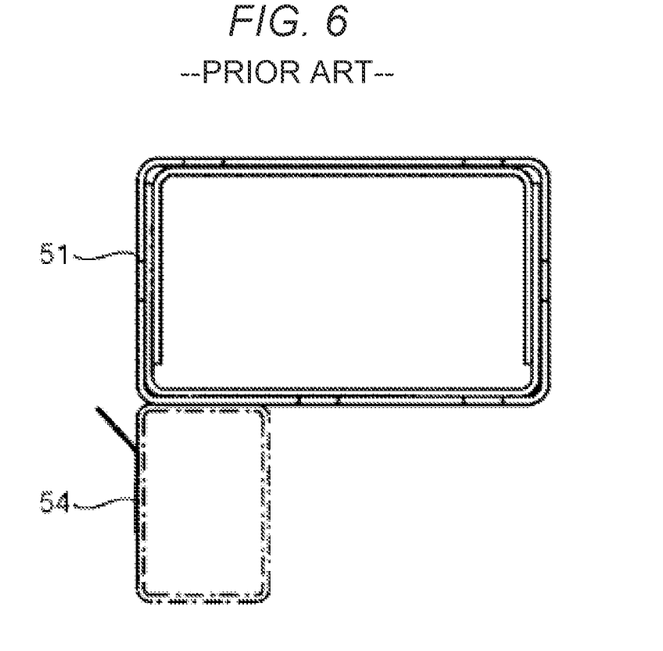
FIG. 6 is a cross-sectional view illustrating a hollow rectangular frame of the roof structure of FIG. 5 that is welded to an upper surface of a roof side rail.

As illustrated in FIGS. 5 and 6, the roof structure disclosed in Japanese Utility Model Registration No. 3,194,846 includes a hollow rectangular frame 51 on an outer circumference of a roof of a vehicle body. This hollow rectangular frame 51 includes a frame body having a hollow rectangular cross section. It is placed on an upper end of each of a front header 52, a rear header 53, and a pair of roof side rails 54 that are located at an upper end of the vehicle body, and welded to these roof side rails 54 and the like. Instead of a roof reinforcing member, this hollow rectangular frame 51 reinforces the roof.

However, in the vehicle roof structure in Japanese Utility Model Registration No. 3,194,846, the hollow rectangular frame 51 is welded to the roof side rails 54 vertically. Accordingly, when a large load is applied to one of the roof side rails 54 during a side collision of the vehicle, a large shearing force is applied to a welded portion of the hollow rectangular frame 51, which possibly damages the welded portion. As a result, there is a possibility that the load is no longer transmitted to the hollow rectangular frame 51. In this case, it is difficult to maintain side collision performance of the vehicle.

SUMMARY

The present disclosure has been made in view of the above circumstance and therefore has a purpose of providing a vehicle roof structure capable of maintaining side collision performance of a vehicle even without providing a roof reinforcing member.

In order to solve the above problem, the vehicle roof structure according to the present disclosure includes a pair of roof side rails spaced from each other in a width direction of a vehicle body, each constituting a framework of a side portion of the roof; a front header and a rear header that are spaced from each other in a longitudinal direction of the vehicle body and respectively constitute a framework in a front end portion and a rear end portion of the roof; a roof panel that covers an opening formed by the pair of roof side rails, the front header, and the rear header; and an annular frame that is joined to a circumferential edge of the roof panel and supports the roof panel. The annular frame has higher rigidity than the roof panel, is arranged in the opening, and is joined to the pair of roof side rails, the front header, and the rear header.

DETAILED DESCRIPTION

A detailed description will hereinafter be made of a preferred embodiment of the present disclosure with reference to the accompanying drawings.

Figure 1:
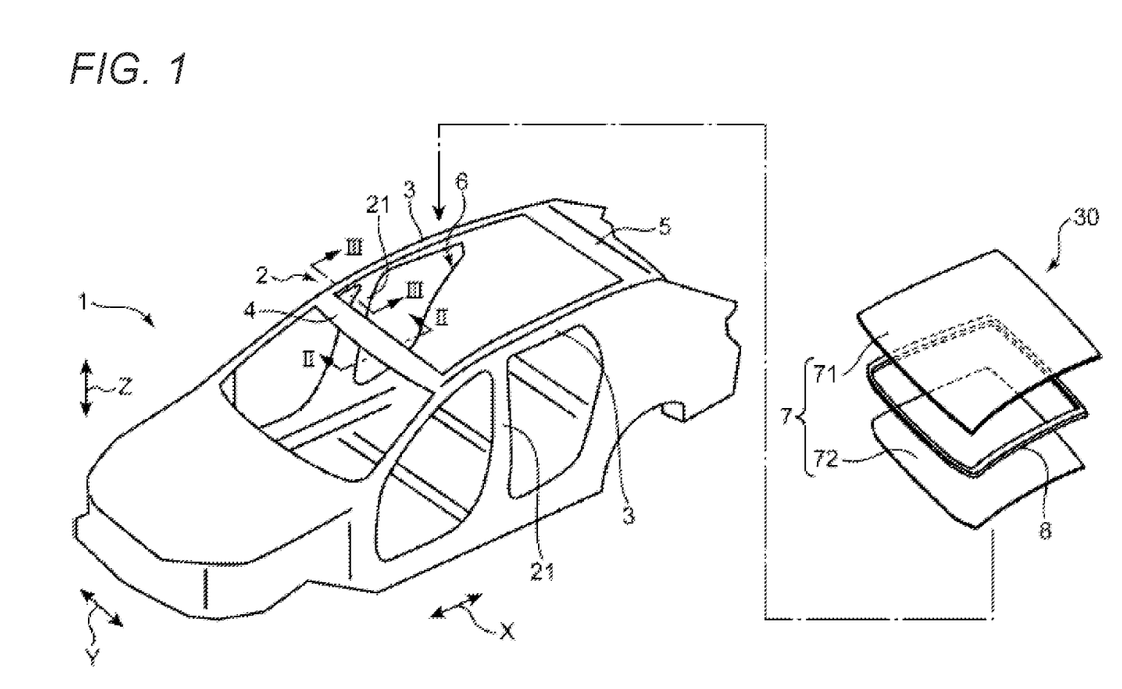
FIG. 1 is an exploded perspective view of a vehicle roof structure according to an embodiment of the present disclosure.

As illustrated in FIG. 1, a vehicle roof structure according to this embodiment constitutes a roof 2 of a vehicle, and includes a pair of roof side rails 3 spaced from each other in a width direction Y of a vehicle body 1; a front header 4 and a rear header 5 spaced from each other in a longitudinal direction X of the vehicle body 1; and a panel unit 30. The pair of roof side rails 3, the front header 4, and the rear header 5 form a rectangular opening 6 of the roof 2, and the opening 6 is closed by the panel unit 30.

The pair of roof side rails 3 are spaced from each other in the width direction Y of the vehicle body 1 and each extend in the longitudinal direction X of the vehicle body 1 to form a frame in a side portion of the roof 2. The roof side rail 3 on each side has a flange portion 15 (see FIG. 2) that projects into the opening 6.

The front header 4 and the rear header 5 are spaced from each other in the longitudinal direction X of the vehicle body 1 and extend in the width direction Y of the vehicle body 1 to respectively form frameworks in a front end portion and a rear end portion of the roof 2. Each of the front header 4 and the rear header 5 has the flange portion 15 (see FIG. 3) that projects into the opening 6.

The panel unit 30 includes a roof panel 7 and an annular frame 8.

The roof panel 7 has a configuration capable of covering the opening 6, which is formed by the pair of roof side rails 3, the front header 4, and the rear header 5.

More specifically, the roof panel 7 in this embodiment is constructed of a double panel in which an outer panel 71 exposed to outside of the vehicle body 1 and an inner panel 72 located in the vehicle body 1 hold the annular frame 8 therebetween and are spaced from each other in a vertical direction Z.

In this embodiment, a description has been made of the double panel having the outer panel 71 and the inner panel 72 as an example of the roof panel 7. However, the present disclosure is not limited thereto. The roof panel 7 may be a single roof panel or may only include the outer panel 71.

Each of the outer panel 71 and the inner panel 72 constituting the roof panel 7 is made from a translucent or semi-translucent synthetic resin material having high rigidity (more specifically, high bending rigidity, twisting rigidity, and the like), for example, translucent fiber reinforced plastic (FRP) made from a translucent synthetic resin that is reinforced by glass fiber, and has translucency. In addition, a film for lighting control and heat shielding may adhere to an inner surface, which faces inside of the vehicle body 1, in each of the outer panel 71 and the inner panel 72.

Furthermore, the inner panel 72 may be subjected to special treatment such that a desired color and/or pattern is visible via transmitted light.

Figure 2:
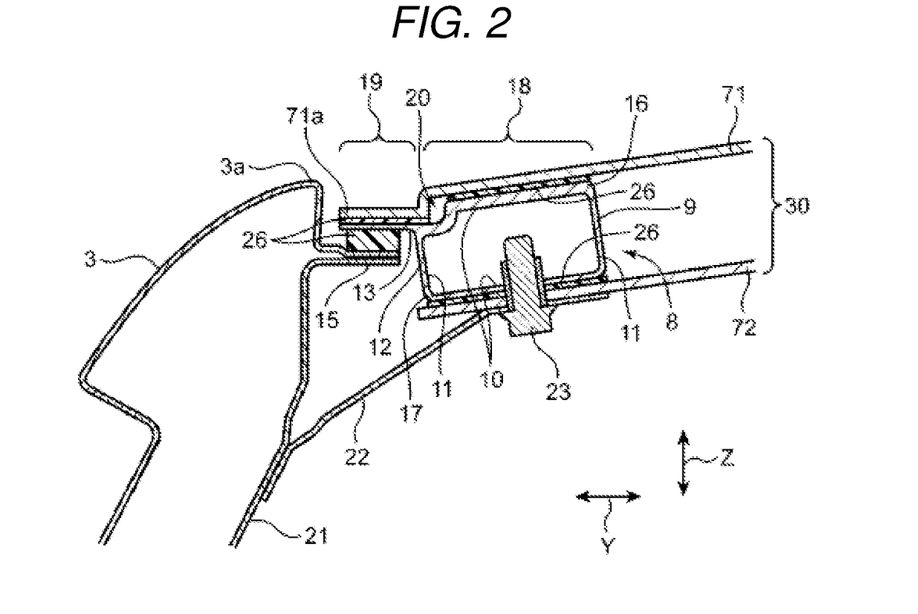
FIG. 2 is a cross-sectional view taken along line II-II in FIG. 1.
Figure 3:
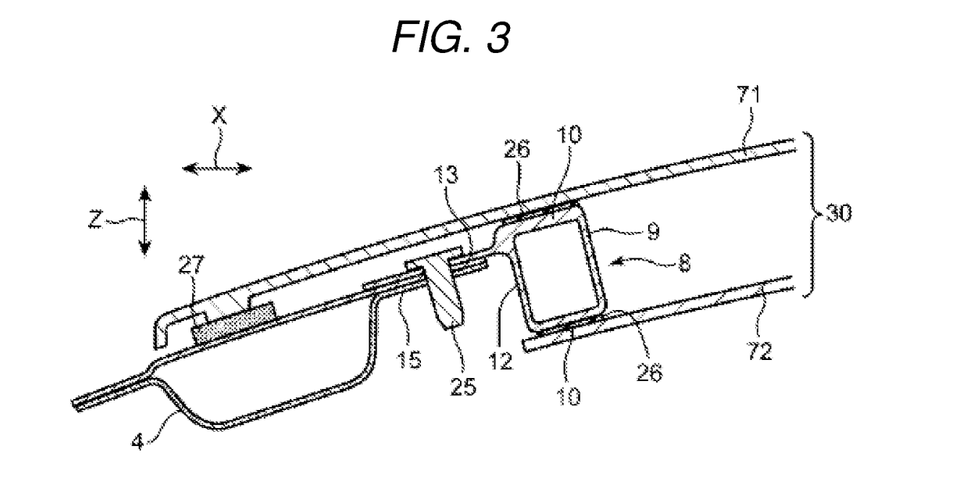
FIG. 3 is a cross-sectional view taken along line in FIG. 1.

As illustrated in FIGS. 1 to 3, the annular frame 8 has a configuration capable of supporting the roof panel 7 by being joined to a circumferential edge of the roof panel 7.

The annular frame 8 is an annular frame body (more specifically, a substantially rectangular frame body as illustrated in FIG. 1) that is manufactured from a material (for example, a fiber reinforced resin such as a synthetic resin (CFRP) that is reinforced by a carbon fiber) having a higher rigidity (more specifically, a higher bending rigidity, a higher twisting rigidity, and the like) than the roof panel 7. The annular frame 8 is arranged in the opening 6 of the vehicle body 1 illustrated in FIG. 1. As illustrated in FIGS. 2 to 3, via a fastening portion 13, which will be described below, and the flange portion 15 of the roof side rail 3 or the like on the other side, the annular frame 8 is adjacent to and joined to each of the paired roof side rails 3 in the width direction Y, and is adjacent to and joined to the front header 4 and the rear header 5 in the longitudinal direction X.

As illustrated in FIGS. 2 to 3, more specifically, the annular frame 8 includes a body portion 9 and the fastening portion 13 that is integrally joined to the body portion 9.

The body portion 9 has a cross-sectional shape having a hollow closed cross section that is formed by a pair of upper and lower panel joint portions 10 and a pair of vertical plate portions 11. The pair of upper and lower panel joint portions 10 extends in a direction toward the inside of the opening 6 of the roof 2 (that is, the width direction Y or the longitudinal direction X), extends along surfaces of circumferential edges of the outer panel 71 and the inner panel 72 of the roof panel 7, and is joined to the circumferential edges. The pair of vertical plate portions 11 extends from the panel joint portions 10 in the vertical direction Z of the vehicle body 1.

The pair of panel joint portions 10 of the body portion 9 are spaced from each other in the vertical direction Z, and firmly adhered to the outer panel 71 and the inner panel 72 by a high-rigid adhesive 26.

The fastening portion 13 projects from an outer circumferential surface of the body portion 9 in a direction toward the flange portion 15. The fastening portion 13 is fastened to each of the paired roof side rails 3, the front header 4, and the rear header 5 via the flange portion 15 that projects into the opening 6. The similar high-rigid adhesive 26 to the above adheres the fastening portion 13 to an upper surface of each of the flange portions 15 extending from the roof side rails 3 and the like.

In this embodiment, as illustrated in FIG. 2, an upper end 16 of the annular frame 8 is located at substantially the same height as an upper end 3a of the roof side rail 3. Furthermore, a lower end 17 of the annular frame 8 is located below the flange portion 15. In this way, it is possible to secure rigidity of the annular frame 8 while the height of the annular frame 8 is secured.

In this embodiment, in the roof panel 7, a side edge portion 71a of the outer panel 71 extends to the fastening portion 13, is superimposed on an upper surface of the fastening portion 13, and is fastened thereto. Then, the side edge portion 71a and the fastening portion 13 are superimposed on the upper surface of the flange portion 15 of the roof side rail 3 and are fastened thereto. The above high-rigid adhesive 26 adheres between the side edge portion 71a and the fastening portion 13 and between the fastening portion 13 and the flange portion 15. In this way, it is possible to transmit a load that is received by the roof side rail 3 during a vehicle collision to the annular frame 8 and the roof panel 7 (more specifically, the outer panel 71) via the flange portion 15.

Furthermore, together with adhesion by the above high-rigid adhesive 26, the side edge portion 71a, the fastening portion 13, and the fastening portion 13 may collectively be fastened by a bolt, a rivet, or the like.

In this embodiment, as illustrated in FIG. 2, a space 20 having a closed cross section is formed by the roof panel 7 and the annular frame 8, and is located between a portion 18 and a portion 19 of the outer panel 71 in the roof panel 7. The portion 18 is joined to the panel joint portion 10 of the body portion 9 in the annular frame 8. The portion 19 is a portion in which the side edge portion 71a of the outer panel 71 is fastened to the fastening portion 13. Since a portion that surrounds the space 20 having the closed cross section is formed by the outer panel 71 and the annular frame 8, it is possible to reinforce a portion around the fastening portion 13.

However, the above space 20 having the closed cross section may be formed by the inner panel 72 and the annular frame 8.

In this embodiment, as illustrated in FIG. 2, on the inside of the vehicle body 1, a coupling member called a gusset 22 is coupled to a portion below the flange portion 15 in the roof side rail 3 illustrated in FIGS. 1 to 2 or a B pillar (center pillar) 21 coupled to a lower portion of the roof side rail 3 by welding or the like. In FIG. 2, the gusset 22 is coupled to the B pillar 21 and is indirectly coupled to the roof side rail 3 via the B pillar 21. An upper end portion of the gusset 22 is mechanically joined to the annular frame 8 and the inner panel 72 of the roof panel 7 by a bolt 23. In this structure, the roof side rail 3 is coupled to the annular frame 8 by both the flange portion 15 and the gusset 22. In this way, it is possible to efficiently transmit the load, which is received by the roof side rail 3 and the B pillar 21 during the side collision of the vehicle, to the annular frame 8 and both the outer panel 71 and the inner panel 72 in the roof panel 7 via two routes of the flange portion 15 and the gusset 22.

Here, threaded to the bolt 23, a caulking nut that is caulked and fixed to the annular frame 8 or the like may be used.

As illustrated in FIG. 3, the flange portion 15 of the front header 4 and the fastening portion 13 of the annular frame 8 are mechanically fastened by using a bolt 25. As the bolt 25, for example, a caulking bolt that is caulked and fixed to the fastening portion 13, or the like may be used. The bolt 25 penetrates the flange portion 15 and is projected downward. A nut is fastened to the bolt 25 from a position below the flange portion 15.

As illustrated in FIG. 3, an end portion on a front side (a left side in FIG. 3) in the outer panel 71 extends to a position above the front header 4 and adheres to an upper surface of the front header 4 by an adhesive 27. As the adhesive 27, a normal adhesive having such a sealing property that can prevent entry of rain water and the like into a clearance between the outer panel 71 and the front header 4 from the outside may be used.

Figure 4:
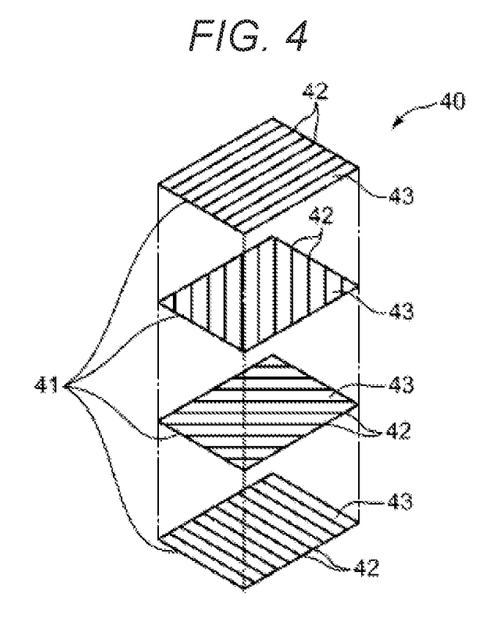
FIG. 4 is an exploded perspective view illustrating a structure of a reinforced fiber sheet that constitutes an annular sheet portion in FIGS. 2 to 3.

In this embodiment, the body portion 9 of the annular frame 8 has a hollow closed cross-sectional shape and, for example, has the hollow rectangular cross-sectional shape as illustrated in FIGS. 2 to 4.

The body portion 9 having the hollow closed cross-sectional shape is formed from a material that includes the synthetic resin such as CFRP. The body portion 9 includes an annular sheet portion 12 that is formed from a fiber reinforced resin sheet bent in an annular shape.

The annular sheet portion 12 is formed by bending a stacked sheet 40 illustrated in FIG. 4 into an annular shape and thereafter subjecting the stacked sheet 40 to a hardening treatment.

The stacked sheet 40 is an embodiment of the fiber reinforced resin sheet in the present disclosure, and is constructed of a stacked body of single-layer sheets 41, each of which is formed from CFRP or the like.

As illustrated in FIG. 4, each of the single-layer sheets 41 that constitute the stacked sheet 40 is made from CFRP, and is manufactured by impregnating plural reinforced fibers (carbon fibers in the case of CFRP) 42 with a synthetic resin 43 and covering the reinforced fibers 42 with the synthetic resin 43. The reinforced fibers 42 are long fibers that extend in parallel with each other.

The stacked sheet 40 is constructed by stacking the plural single-layer sheets 41 in different directions such that extending directions of the reinforced fibers 42 in the single-layer sheets 41 differ from each other. In this way, the stacked sheet 40 forms a single fiber reinforced resin sheet including the reinforced fibers 42, which extend in different directions from each other.

Instead of the stacked sheet 40, the fiber reinforced resin sheet of the present disclosure may be formed by impregnating an intermediate body of plural reinforced fibers 42 (for example, reinforced fibers woven in a lattice shape), arranged in advance to extend in different directions from each other, with synthetic resin.

In the vehicle roof structure of this embodiment, the annular frame 8, which is joined to the circumferential edge of the roof panel 7 and supports the roof panel 7, has high rigidity (more specifically, a high bending rigidity, a high twisting rigidity, and the like). When arranged in the opening 6, which is formed by the pair of roof side rails 3, the front header 4, and the rear header 5, the annular frame 8 is adjacent to and joined to the pair of roof side rails 3 in the width direction Y of the vehicle body 1, and is adjacent to and joined to the front header 4 and the rear header 5 in the longitudinal direction X of the vehicle body 1. In this way, even during a side collision of the vehicle, it is possible to reliably transmit the load received by the roof side rail 3 to the annular frame 8 on the inside of the opening 6 and to bear the load with the highly rigid annular frame 8 and the roof panel 7. Thus, it is possible to maintain side collision performance of the vehicle even without providing a roof reinforcing member that is stretched between the pair of roof side rails 3.

In the vehicle roof structure of this embodiment, the annular frame 8 has the body portion 9 that has a cross-sectional shape including the panel joint portions 10, each of which extends along the surface of the circumferential edge of the roof panel 7 and is joined to the circumferential edge thereof; and the vertical plate portions 11, each of which extends from the panel joint portion 10 in the vertical direction Z of the vehicle body 1.

In the above configuration, the body portion 9 of the annular frame 8 has a cross-sectional shape including the panel joint portions 10, each of which extends along the surface of the circumferential edge of the roof panel 7; and the vertical plate portions 11, each of which extends in the vertical direction Z. Thus, the annular frame 8 has a cross-sectional shape that has resistance to bending and twisting.

In the vehicle roof structure of this embodiment, the body portion 9 of the annular frame 8 has a hollow closed cross-sectional shape. Thus, it is possible to further improve the rigidity (the bending rigidity, the twisting rigidity, and the like) of the annular frame 8 and to reduce weight of the annular frame 8.

In the vehicle roof structure of this embodiment, the annular frame 8 is formed from fiber reinforced resin such as CFRP. Thus, compared to a frame that is made of steel, the annular frame 8 is light in weight and has high rigidity.

In addition, the body portion 9 of the annular frame 8 in this embodiment includes annular sheet portion 12 formed from the stacked sheet 40 bent in an annular shape. The stacked sheet 40 includes plural reinforced fibers 42, each of which is a long fiber; and synthetic resin that covers the plural reinforced fibers 42. At least some of the plural reinforced fibers 42 extend in different directions. In this configuration, the stacked sheet 40, which constitutes annular sheet portion 12, includes plural reinforced fibers 42 which are long fibers extending in different directions, and these reinforced fibers 42 can receive the load from any of the different directions. Thus, the annular frame 8 can withstand a collision in any direction including a side collision.

In the vehicle roof structure of this embodiment, the annular frame 8 includes fastening portion 13 that is fastened to each of the paired roof side rails 3, the front header 4, and the rear header 5.

With such a configuration, it is possible to reliably transmit the load from the pair of roof side rails 3, the front header 4, and the rear header 5 to the annular frame 8 via the fastening portion 13 during a vehicle collision and to further reliably bear the load during the vehicle collision by the highly rigid annular frame 8 and the roof panel 7.

In the vehicle roof structure of this embodiment, the annular frame 8 further includes fastening portion 13 that is fastened to each of the paired roof side rails 3, the front header 4, and the rear header 5.

In the vehicle roof structure of this embodiment, the roof side rail 3 has flange portion 15 that projects into the opening 6. The fastening portion 13 is fastened to the flange portion 15. With such a configuration, it is possible to reliably transmit the load, which is applied to the roof side rail 3 during a side collision of the vehicle, to the annular frame 8 via the flange portion 15 and the fastening portion 13.

In the vehicle roof structure of this embodiment, the upper end 16 of the annular frame 8 is located at the substantially same height as the upper end 3a of the roof side rail 3. The lower end 17 of the annular frame 8 is located below the flange portion 15.

With the above configuration, in which the fastening portion 13 of the annular frame 8 is fastened to the flange portion 15 on the roof side rail 3 side, the annular frame 8 is arranged such that the upper end 16 of the annular frame 8 is located at substantially the same height as the upper end 3a of the roof side rail 3 and the lower end 17 of the annular frame 8 is located below the flange portion 15. In this way, it is possible to secure the height of the annular frame 8 and to improve the rigidity (the twisting rigidity, the bending rigidity, and the like) of the annular frame 8.

In the vehicle roof structure of this embodiment, the roof panel 7 has side edge portion 71a that extends to the fastening portion 13 and is fastened to the fastening portion 13. The side edge portion 71a and the fastening portion 13 are fastened to the flange portion 15 of the roof side rail 3.

In the above configuration, both the side edge portion 71a of the roof panel 7 and the fastening portion 13 of the annular frame 8 are fastened to the flange portion 15 of the roof side rail 3. Thus, it is possible to directly transmit the load, which is received by the roof side rail 3 during the vehicle collision, to the roof side rail 3 without interposing the body portion 9 of the annular frame 8 and to reliably disperse the load to both the annular frame 8 and the roof panel 7 so as to be received by the annular frame 8 and the roof panel 7.

In the vehicle roof structure of this embodiment, the space 20 having a closed cross section is formed by the roof panel 7 and the annular frame 8, and is located between portion 18, which is joined to the panel joint portion 10 of the body portion 9 in the annular frame 8, and portion 19, in which the side edge portion 71a is fastened to the fastening portion 13, in the roof panel 7.

In the above configuration, space 20 having a closed cross section is formed by the roof panel 7 and the annular frame 8, and is located between the portion 18, which is joined to the panel joint portion 10 of the body portion 9 in the annular frame 8, and the portion 19, in which the side edge portion 71a is fastened to the fastening portion 13, in the roof panel 7. The portion around the fastening portion 13 is reinforced by the portion surrounding this space 20 having the closed cross section. Thus, it is possible to improve the rigidity (the twisting rigidity, the bending rigidity, and the like) around the fastening portion 13. In addition, due to provision of this space 20 having the closed cross section, it is possible to tolerate an assembly error between the annular frame 8, which is joined to the flange portion 15 of the roof side rail 3, and the roof panel 7.

For example, even in the case where a layer of the high-rigid adhesive 26 slightly spreads beyond a specified area in each of the above joint portions 18, 19, the above space 20 accepts the spreading adhesive 26. Thus, such a problem as assembly failure is less likely to occur.

In the vehicle roof structure of this embodiment, the roof panel 7 is translucent. With such a configuration, a degree of freedom in light permeability is increased due to absence of a roof reinforcing member that extends between the pair of roof side rails 3.

The vehicle roof structure according to this embodiment forms the roof of the vehicle and includes the pair of roof side rails that are spaced from each other in the width direction of the vehicle body, each constituting the framework of a side portion of the roof; the front header and the rear header that are spaced from each other in the longitudinal direction of the vehicle body and respectively constitute frameworks in the front end portion and the rear end portion of the roof; the roof panel that covers the opening formed by the pair of roof side rails, the front header, and the rear header; and the annular frame that is joined to the circumferential edge of the roof panel and supports the roof panel. The annular frame has a higher rigidity than the roof panel, is arranged in the opening, and is joined to the pair of roof side rails, the front header, and the rear header.

In such a configuration, the annular frame, which is joined to the circumferential edge of the roof panel and supports the roof panel, has a high rigidity. When arranged in the opening formed by the pair of roof side rails, the front header, and the rear header, the annular frame is joined to the pair of roof side rails, the front header, and the rear header. In this way, even when another vehicle collides with the side portion of the vehicle (that is, a side collision), it is possible to reliably transmit the load received by the roof side rail to the annular frame on the inside of the opening and to bear the load with the highly rigid annular frame and the roof panel. Thus, it is possible to maintain side collision performance of the vehicle even without providing a roof reinforcing member that extends between the pair of roof side rails.

In the above vehicle roof structure, the annular frame preferably has the body portion that has the cross-sectional shape including the panel joint portions, each of which extends along the surface of the circumferential edge of the roof panel and is joined to the circumferential edge thereof; and the vertical plate portions, each of which extends from the panel joint portion in the vertical direction of the vehicle body.

With such a configuration, the body portion of the annular frame has the cross-sectional shape including the panel joint portions, each of which extends along the surface of the circumferential edge of the roof panel; and the vertical plate portions, each of which extends in the vertical direction. Thus, it is possible to obtain the annular frame having the cross-sectional shape that has resistance to bending and twisting.

In the above vehicle roof structure, the body portion preferably has the hollow closed cross-sectional shape that is formed by the pair of the panel joint portions and the pair of the vertical plate portions.

With such a configuration, it is possible to further increase the rigidity of the annular frame and to reduce weight of the annular frame.

In the above vehicle roof structure, the annular frame is preferably formed from fiber reinforced resin.

Since the annular frame is formed from fiber reinforced resin, compared to a frame that is made of steel, the annular frame is light in weight and has high rigidity.

In the above vehicle roof structure, the body portion preferably includes the annular sheet portion that is formed from a fiber reinforced resin sheet bent in an annular shape. The fiber reinforced resin sheet preferably includes plural reinforced fibers, each of which is a long fiber; and synthetic resin that covers the plural reinforced fibers. At least some of the plural reinforced fibers preferably extend in different directions.

With such a configuration, the fiber reinforced resin sheet, which constitutes the annular sheet portion, includes the plural reinforced fibers as long fibers extending in different directions, and these reinforced fibers can receive the load from any of the different directions. Thus, the annular frame can withstand a collision in any direction including a side collision.

In the above vehicle roof structure, the annular frame further preferably includes the fastening portion that is fastened to each of the paired roof side rails, the front header, and the rear header.

With such a configuration, it is possible to reliably transmit the load from the pair of roof side rails, the front header, and the rear header to the annular frame via the fastening portion during a vehicle collision and to further reliably bear the load during the vehicle collision by the highly rigid annular frame and the roof panel.

In the above vehicle roof structure, the roof side rail preferably has the flange portion that projects into the opening, and the fastening portion is preferably fastened to the flange portion.

With such a configuration, it is possible to reliably transmit the load, which is applied to the roof side rail during a side collision of the vehicle, to the annular frame via the flange portion and the fastening portion.

In the above vehicle roof structure, the upper end of the annular frame is preferably located at the substantially same height as the upper end of the roof side rail, and the lower end of the annular frame is preferably located below the flange portion.

With such a configuration, in which the fastening portion of the annular frame is fastened to the flange portion on the roof side rail side, the annular frame is arranged such that the upper end of the annular frame is located at the substantially same height as the upper end of the roof side rail and the lower end of the annular frame is located below the flange portion. In this way, it is possible to secure the height of the annular frame and to improve the rigidity of the annular frame.

In the above vehicle roof structure, the roof panel preferably has the side edge portion that extends to the fastening portion and is fastened to the fastening portion. The side edge portion and the fastening portion are preferably fastened to the flange portion of the roof side rail.

With such a configuration, both of the side edge portion of the roof panel and the fastening portion of the annular frame are fastened to the flange portion of the roof side rail. Thus, it is possible to directly transmit the load, which is received by the roof side rail during a vehicle collision, to the roof side rail without interposing the body portion of the annular frame and to reliably disperse the load to both of the annular frame and the roof panel so as to be received by the annular frame and the roof panel.

In the above vehicle roof structure, a space having a closed cross section is preferably formed by the roof panel and the annular frame, and is preferably located between the portion, which is joined to the panel joint portion of the body portion in the annular frame, and the portion, in which the side edge portion is fastened to the fastening portion, in the roof panel.

With such a configuration, the space having the closed cross section is formed by the roof panel and the annular frame, and is located between the portion, which is joined to the panel joint portion of the body portion in the annular frame, and the portion, in which the side edge portion is fastened to the fastening portion, in the roof panel. The portion around the fastening portion is reinforced by the portion surrounding this space having the closed cross section. Thus, it is possible to improve the rigidity around the fastening portion. In addition, due to provision of this space having the closed cross section, it is possible to tolerate assembly error between the annular frame, which is joined to the flange portion of the roof side rail, and the roof panel.

In the above vehicle roof structure, the roof panel is preferably translucent.

With such a configuration, the degree of freedom of light permeability is increased due to the absence of a roof reinforcing member that extends between the pair of roof side rails.

As it has been described herein, according to the vehicle roof structure of this embodiment, it is possible to maintain side collision performance of the vehicle even without providing a roof reinforcing member.

What is claimed is:

1. A roof structure of a roof of a vehicle, the vehicle roof structure comprising:
   a pair of roof side rails spaced from each other in a width direction of a vehicle body, each of the side rails forming a side portion of the roof;
   a front header and a rear header spaced from each other in a longitudinal direction of the vehicle body and respectively forming a front end portion and a rear end portion of the roof;
   a roof panel that covers an opening formed by the pair of roof side rails, the front header, and the rear header; and
   an annular frame that is joined to circumferential edges of the roof panel and supports said roof panel,
   wherein the annular frame has a higher rigidity than the roof panel, is disposed in the opening, and is joined to the pair of roof side rails, the front header, and the rear header,
   the annular frame has a body portion that has a cross-sectional shape including:
   a pair of panel joint portions that extend along surfaces of the circumferential edges of the roof panel and are joined to said circumferential edges; and
   a pair of vertical plate portions each of which extends from one of said pair of panel joint portions in a vertical direction of the vehicle body, and
   the body portion has a hollow closed cross-sectional shape comprising the pair of panel joint portions and the pair of vertical plate portions.

2. The vehicle roof structure according to claim 1, wherein the annular frame comprises a fiber reinforced resin.

3. The vehicle roof structure according to claim 1, wherein
   the body portion includes an annular sheet portion comprising a fiber reinforced resin sheet bent in an annular shape,
   the fiber reinforced resin sheet includes plural reinforced fibers, each of which is a long fiber; and a synthetic resin that covers said plural reinforced fibers, and
   at least some of the plural reinforced fibers extend in different directions.

4. The vehicle roof structure according to claim 2, wherein the annular frame further includes a fastening portion that is fastened to each of the paired roof side rails, the front header, and the rear header.

5. The vehicle roof structure according to claim 4, wherein
   the roof side rail has a flange portion that projects into the opening, and
   the fastening portion is fastened to the flange portion.

6. A roof structure of a roof of a vehicle, the vehicle roof structure comprising:
   a pair of roof side rails spaced from each other in a width direction of a vehicle body, each of the side rails forming a side portion of the roof;
   a front header and a rear header spaced from each other in a longitudinal direction of the vehicle body and respectively forming a front end portion and a rear end portion of the roof;
   a roof panel that covers an opening formed by the pair of roof side rails, the front header, and the rear header; and
   an annular frame that is joined to a circumferential edge of the roof panel and supports said roof panel,
   wherein the annular frame has a higher rigidity than the roof panel, is disposed in the opening, and is joined to the pair of roof side rails, the front header, and the rear header,
   the annular frame further includes a fastening portion that is fastened to each of the paired roof side rails, the front header, and the rear header,
   the roof side rail has a flange portion that projects into the opening,
   the fastening portion is fastened to the flange portion,
   an upper end of the annular frame is located at substantially the same height as an upper end of the roof side rail, and
   a lower end of the annular frame is located below the flange portion.

7. A roof structure of a roof of a vehicle, the vehicle roof structure comprising:
- a pair of roof side rails spaced from each other in a width direction of a vehicle body, each of the side rails forming a side portion of the roof;
- a front header and a rear header spaced from each other in a longitudinal direction of the vehicle body and respectively forming a front end portion and a rear end portion of the roof;
- a roof panel that covers an opening formed by the pair of roof side rails, the front header, and the rear header; and
- an annular frame that is joined to a circumferential edge of the roof panel and supports said roof panel,
- wherein the annular frame has a higher rigidity than the roof panel, is disposed in the opening, and is joined to the pair of roof side rails, the front header, and the rear header,
- the annular frame further includes a fastening portion that is fastened to each of the paired roof side rails, the front header, and the rear header,
- the roof side rail has a flange portion that projects into the opening,
- the fastening portion is fastened to the flange portion,
- the roof panel has a side edge portion that extends to the fastening portion and is fastened to said fastening portion, and
- the side edge portion and the fastening portion are fastened to the flange portion of the roof side rail.

8. The vehicle roof structure according to claim 7, wherein a space having a closed cross section is formed by the roof panel and the annular frame, and is located between a portion which is joined to the panel joint portion of the body portion in the annular frame, and a portion in which the side edge portion is fastened to the fastening portion, in the roof panel.

9. The vehicle roof structure according to claim 8, wherein the roof panel is translucent.

10. The vehicle roof structure according to claim 1, wherein the annular frame comprises a fiber reinforced resin.

11. The vehicle roof structure according to claim 1, wherein the annular frame further includes a fastening portion that is fastened to each of the paired roof side rails, the front header, and the rear header.

12. The vehicle roof structure according to claim 10, wherein the annular frame further includes a fastening portion that is fastened to each of the paired roof side rails, the front header, and the rear header.

13. The vehicle roof structure according to claim 11, wherein
- the roof side rail has a flange portion that projects into the opening, and
- the fastening portion is fastened to the flange portion.

14. The vehicle roof structure according to claim 1, wherein the roof panel is translucent.

* * * * *